United States Patent [19]

Kitamura et al.

[11] Patent Number: 5,094,551
[45] Date of Patent: Mar. 10, 1992

[54] PRELOAD CONTROL APPARATUS FOR BEARINGS WITH SHAPE MEMORY ALLOY SPRINGS

[75] Inventors: Koichiro Kitamura; Katsuji Taniguchi, both of Takaoka, Japan

[73] Assignee: Kitamura Machinery Co., Ltd., Toyama, Japan

[21] Appl. No.: 579,059

[22] Filed: Sep. 7, 1990

[30] Foreign Application Priority Data

Mar. 30, 1989 [JP] Japan .................................. 1-76500

[51] Int. Cl.⁵ .............................................. E16C 83/00
[52] U.S. Cl. ....................................... 384/518; 384/563
[58] Field of Search ................. 384/517, 518, 519, 563

[56] References Cited

U.S. PATENT DOCUMENTS 4,611,934  9/1986  Piotrowski et al. ................. 384/517
4,657,412  4/1987  McLarty et al. ................. 384/517 X
4,676,667  6/1987  Komatsu et al. ................. 384/517 X
4,850,719  7/1989  Moseley et al. ................. 384/517 X

FOREIGN PATENT DOCUMENTS 920526  11/1954  Fed. Rep. of Germany ...... 384/518
619472  3/1949  United Kingdom ................ 384/519

Primary Examiner—Thomas R. Hannon
Attorney, Agent, or Firm—Pravel, Gambrell, Hewitt, Kimball & Krieger

[57] ABSTRACT

A preload control apparatus for use in a spindle (12) of a machine tool comprises a bearing (16,17) and a plurality of springs (26a to 26d) for exerting a preload on the bearing (16, 17). Some or all of the springs (26a to 26d) are at least partly made of a shape memory alloy so that the preload on the bearing (16,17) can be adjusted with changes in temperature of the springs (26a to 26d).

10 Claims, 3 Drawing Sheets

PRELOAD CONTROL APPARATUS FOR BEARINGS WITH SHAPE MEMORY ALLOY SPRINGS

BACKGROUND OF THE INVENTION

This invention relates to a preload control apparatus for bearings which is suitable for a spindle of a machine tool.

PRIOR ART

In recent years, it is desired to operate a machine tool at a high speed. However, if a spindle rotates at 15,000-20,000 r.p.m., bearings supporting the spindle and their related members expand with heat so that a preload on the bearings becomes large. As a result, the bearings are sometimes broken or seized.

On the other hand, if the spindle rotates at a low speed, a heavy maching operation is usually required. In such a case, a large preload on the bearing is necessary.

Preload control apparatuses have been proposed, which adjust a preload for bearings at plural stages. The conventional preload control apparatuses include piezo electric sensors or hydraulic systems for the preload control purposes.

However, the conventional preload control apparatuses have a large and complicated construction. The production and maintenance costs are relatively high.

SUMMARY OF THE INVENTION

The object of this invention is to provide a preload control apparatus for bearings which has a simple construction and can be manufactured at a low cost with easy maintenance.

According to this invention, a preload control apparatus includes a bearing and a plurality of springs for exerting a preload on the bearing. The springs are at least partly made of a shape memory alloy so that the preload on the bearing can be adjusted with changes in temperature of the springs.

Preferably, the springs have different shape memory effects from each other at various temperatures so that the preload on the bearing can be automatically adjusted at multi-stages.

Examples of the shape memory alloy are Ti-Ni, Au-Cd, Cu-Au-Zn, In-Tl, In-Cd, Ti-Ni-Cu, Cu-Zn-Al and Cu-Al-Ni.

In the preload control apparatus of this invention, if the bearing is heated, the heat is transmitted to the springs. When the springs are heated to a predetermined temperature, they are deformed due to their shape memory effect such that the preload on the bearing decreases. If plural springs have different shape memory effects from each other, then the preload on the bearing decreases at plural stages.

Accordingly, a preload control apparatus according to this invention can be constructed in a simple manner at a low cost. It is possible to adjust automatically a preload on a bearing or bearings.

DETAILED DESCRIPTION OF THE PREFERRED EMBODIMENT

Figure 3:
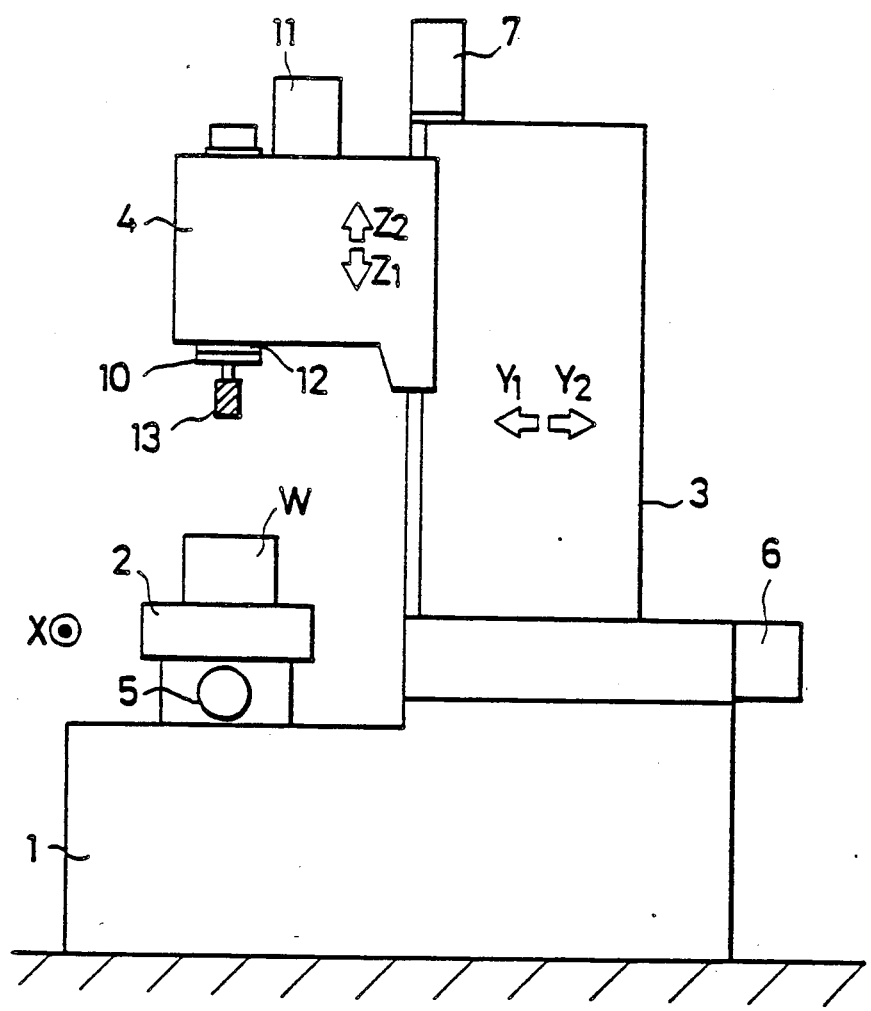
FIG. 3 is a side view schematically showing a machine tool having the spindle head of FIG. 1.

Referring to FIG. 3, a machine tool includes a bed 1, a table 2, a column 3, a spindle head 4 and plural motors 5, 6, 7, 11.

A workpiece W is set on the table 2. The table 2 can move by means of the motor 5 in two opposite directions X perpendicular to the drawing. The column 3 can move in two opposite directions Y1, Y2 by means of the motor 6. The spindle head 4 can move in two opposite directions Z1, Z2 by means of the motor 7.

A tool holder 10 is detachably attached to a spindle 12 in the spindle head 4. A tool 13 held by the tool holder 10 rotates by means of the motor 11.

Figure 1:
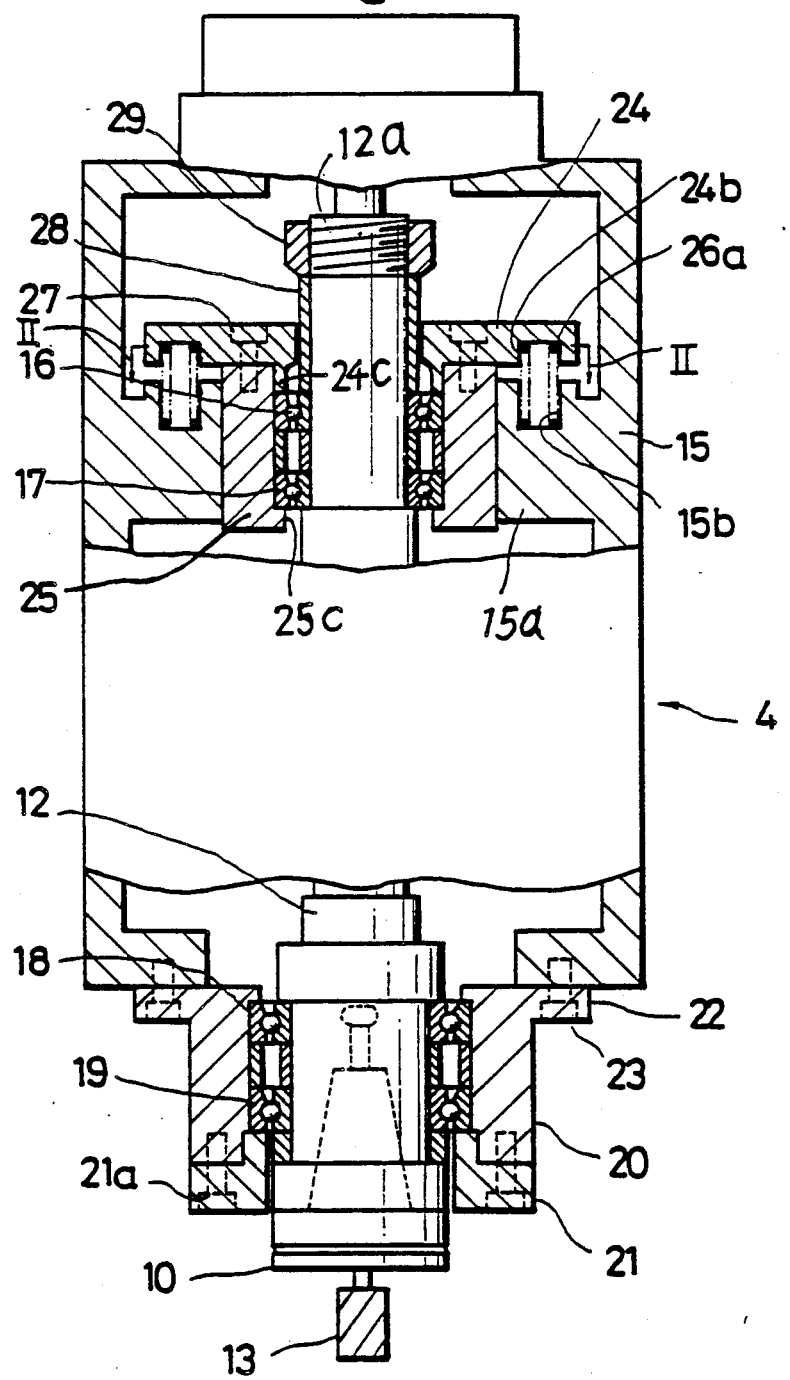
FIG. 1 is a sectional view showing a main portion of a spindle head equipped with a preload control apparatus for bearings according to this invention.

Referring to FIG.1, the spindle 12 is rotatably supported by a frame 15 via upper ball bearings 16, 17 and lower ball bearings 18, 19. A tube-shaped lower extension 20 has a flange 22 fixed to the frame 15 by means of bolts 23. A presser ring 21 is fixed to a lower end of the lower extension 20 by means of bolts 21a. The lower bearings 18, 19 are arranged between the lower extension 20 and the spindle 12 such that the spindle 12 can rotate within the lower extension 20.

The lower bearings 18, 19 have inner rings fixedly positioned relative to the spindle 12 and outer rings fixedly positioned relative to the lower extension 20.

Figure 2:
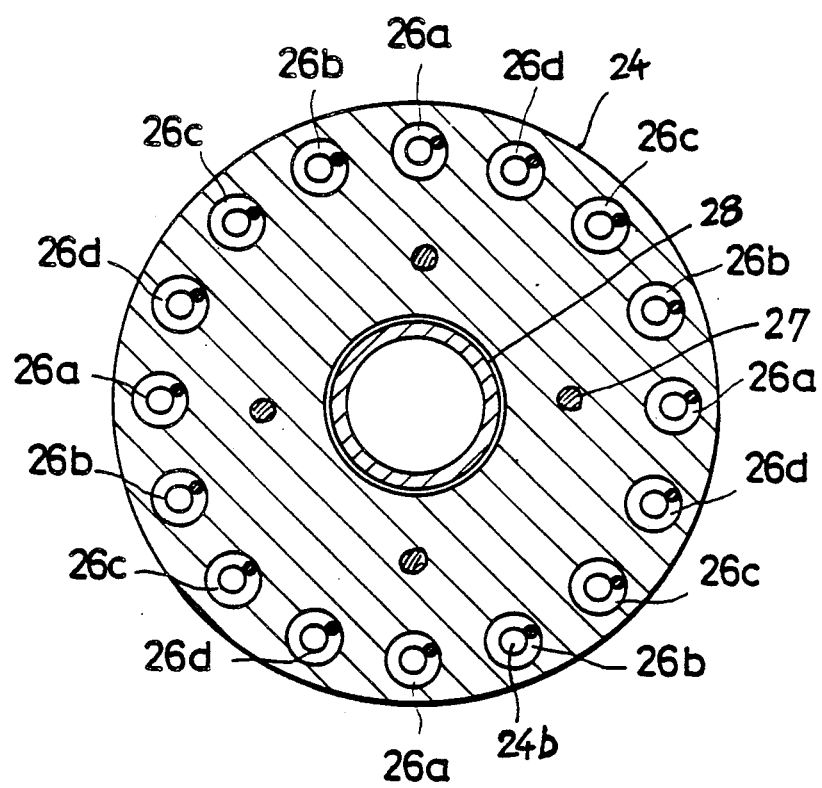
FIG. 2 is a sectional view taken along the line II—II.

The frame 15 has an inner flange 15a near the upper bearings 16, 17. A sleeve-shaped moving member 25 can slidably move along the inner flange 15a in a vertical direction. A presser plate 24 is fixed to the upper end of the moving member 25 by means of bolts 27 in such a way that they press the upper bearings 16, 17. A plurality of circular recesses 24b, which number 16 in the illustrated embodiment, are formed in the presser plate 24 at regular intervals along an imaginary circle as best shown in FIG.2. The inner flange 15a has a plurality of recesses 15b corresponding in position to the recesses 24b of the presser plate 24. Four sets of springs 26a to 26d are arranged between the recesses 15b of the flange 15a and the recesses 24b of the presser plate 24, respectively. The springs 26a to 26c are made of a shape memory alloy so that they are deformed in a contraction direction when they are heated to a predetermined temperature or temperatures. The springs 26d are made of an ordinary spring material.

The upper bearings 16, 17 are arranged between the moving member 25 and the spindle 12. The inner rings of the bearings 16, 17 are fixedly positioned relative to the spindle 12 by a tube-shaped member 28 and a nut-shaped presser member 29 having a female thread portion which engages a male thread portion 12a of the spindle 12. Also, the outer rings of the upper bearings 16, 17 are fixedly positioned relative to the moving member 25 by a skirt-shaped extension 24c of the presser plate 24 and a small flange-shaped projection 25c of the moving member 25.

As well-known, shape memory alloys have such a property that a metallic object of a given shape is cooled from a given temperature $T_1$ to a lower temperature $T_2$ where it is deformed so as to change its shape. Upon reheating from $T_2$ to $T_1$, the shape change accomplished at $T_2$ is recovered so that the object returns to its original configuration. This thermoelastic property of the shape memory alloys is associated with the fact that they undergo a martensitic phase transformation when they are cooled or heated between $T_1$ and $T_2$.

The springs 26a to 26d elastically press the plate 24 upwardly at a room temperature so that the moving member 25 and the outer rings of the upper bearings 16, 17 are pulled upwardly. Thus, the upper bearings 16, 17 are in a preload condition due to the force of the springs 26a to 26d.

The springs 26a to 26c have different thermoelastic properties from each other. For example, assuming that the springs 26a to 26c are designed to return to their original contracted configuration when they are heated at 25° C., 30° C. and 40° C., all springs 26a to 26d effectively press the plate 24 below 25° C. For instance, the maximum preload of 132kg on the bearings 16, 17. When the bearings 16, 17 are heated to a temperature ranging between 25° C. and 30° C., the heat is transmitted to the springs 26a to 26d, and then only the springs 26a are deformed so as to be contracted. Thus, except the springs 26a, the springs 26b to 26d effectively press the plate 24 so as to exert an intermediate preload of 84kg on the bearings. At a temperature from 39° C. to 40° C., the springs 26a and 26b are in a contracted condition while the springs 26c and 26d press the plate 24 so as to exert a preload of 48kg on the bearings 16, 17. At a temperature of 40° C. or more, the springs 26a to 26c are in a contracted condition while only the springs 26d press the plate 24 so as to exert the minimum preload of 20kg on the bearings 16, 17.

This invention is not limited to the above-stated embodiment only. For example, the number and arrangement of springs for pressing the plate 24 may be optionally selected. Although in the illustrated embodiment the springs 26a to 26c are deformed in a contraction direction at the predetermined temperatures, they can be designed to be deformed in an expansion direction so as to decrease a preload on the bearings at plural stages. In such a case, at a relatively lower temperature or temperatures, springs do not effectively press the plate 24. When they are heated, they are deformed so as to press the plate 24.

Although in the above-stated embodiment the whole of each springs 26a to 26c is made of a shape memory alloy, they can include some portion made of an ordinary spring material and/or any other materials.

Preferably a preload control apparatus according to this invention is used for bearings supporting a spindle of a machine tool, but it can be used for any other bearings.

What is claimed is:

1. A preload control apparatus comprising a bearing (16, 17) and a plurality of springs (26a to 26d) for exerting a preload on the bearing (16, 17), some or all of the springs (26a to 26d) being at least partly made of a shape memory alloy, wherein springs comprised of a shape memory alloy have different shape memory properties so that the preload on the bearing (16, 17) can be adjusted with changes in temperature of the springs (26a to 26d) and so that springs can be deformed at plural stages when they are heated.

2. A preload control apparatus as defined in claim 1, further comprising a frame (15), a spindle (12) rotatable relative to the frame (15), and means (24,25) fixed relative to the bearing (16,17) and movable relative to the frame (15) along the spindle (12) for exerting the preload on the bearing (16,17) by means of the springs (26a to 26d).

3. A preload control apparatus as defined in claim 2, wherein the exerting means (24,25) includes a moving member (25) slidable on a flange portion (15a) of the frame (15) and a plate (24) fixed to the moving member (25), the springs (26a to 26d) being arranged between the plate (24) and the flange portion (15a) of the frame (15).

4. A preload control apparatus as defined in claim 3, wherein the bearing (16,17) includes an outer ring fixed to the moving member (25) by means of a presser extension (24c) of the plate (24) and a projection (25c) of the moving member (25) and an inner ring fixed to the spindle (12) by means of a nut-shaped presser member (29) which is screwed with the spindle (12).

5. A preload control apparatus comprising:
a frame (15) having an inner flange (15a);
a spindle (12) of a machine tool;
a bearing means (16,17) arranged between the spindle (12) and the inner flange (15a) of the frame (15) for supporting rotatably the spindle (12) relative to the frame (15), the bearing means (16, 17) having an inner ring, an outer ring and plural balls placed between the inner and outer rings;
means (28, 29) for fixedly positioning the inner ring of the bearing means (16, 17) on the spindle (12);
a moving member (25) fixed to the outer ring of the bearing means (16, 17) and slidably movable on the inner flange (15a) of the frame (15) along the spindle (12);
a plurality of springs (26a to 26d) for elastically exerting a preload on the bearing means (16, 17), some or all of the springs (26a to 26d) being at least partly made of a shape memory alloy, wherein springs comprised of a shape memory alloy have different shape memory properties so that the preload on the bearing (16, 17) can be adjusted with changes in temperature of the springs (26a to 26d) and so that springs can be deformed at plural stages when they are heated.

6. A preload control apparatus as defined in claim 5, further comprising a plate (24) fixed to the moving member (25) wherein the springs (26a to 26d) are arranged between the plate (24) and the inner flange (15a) of the frame (15).

7. A preload control apparatus as defined in claim 5, wherein the moving member (25) is sleeve-shaped.

8. A preload control apparatus comprising:
a frame having an inner flange;
a spindle of a machine tool;
a bearing means arranged between the spindle and the inner flange of the frame for supporting rotatably the spindle relative to the frame, the bearing means having an inner ring, an outer ring and plural balls placed between the inner and outer rings;
means for fixedly positioning the inner ring of the bearing means on the spindle;
a moving member fixed to the outer ring of the bearing means and slidably movable on the inner flange of the frame along the spindle;
a plate fixed to the moving member; and
a plurality of springs separately arranged along a circle between the plate and the inner flange of the frame for elastically exerting a preload on the bearing means, some or all of the springs being at least partly made of a shape memory alloy so that the preload on the bearing can be adjusted with changes in temperature of the springs in such a way that the preload decreases when the temperature increases.

9. A preload control apparatus as defined in claim 8, wherein the moving member is sleeve-shaped.

10. A preload control apparatus as defined in claim 8, wherein the springs have different shape memory properties so that they can be deformed at plural stages when they are heated.

* * * * *